Patented May 24, 1932

1,859,651

UNITED STATES PATENT OFFICE

ERNEST F. BOWERS, OF LANSDALE, PENNSYLVANIA, ASSIGNOR OF ONE-THIRD TO DANA W. BOWERS AND ONE-THIRD TO CHARLES T. ASBURY, BOTH OF PHILADELPHIA, PENNSYLVANIA

ANTIFERMENTIVE SOLDERING FLUX

No Drawing. Application filed September 4, 1930. Serial No. 479,791.

This invention relates to soldering fluxes and particularly to a soldering flux designed to be used in soldering metallic food containers.

The general object of the invention is the production of a soldering flux which is non-poisonous, and non-corrosive and wherein the most active ingredient is an anti-ferment which will serve as a preservative of canpacked foods, should a portion of the flux enter a food container while being sealed with solder.

A further object is to provide a soldering flux which will not curdle milk at normal temperatures or during the soldering or sealing operation even though a portion of the flux applied should enter the can.

Another object is the production of a composition of soldering flux with a rosin base which may be melted and maintained at sufficient temperature for its introduction as a core in wire solder without decomposition of the said flux and in this connection to provide a composition which will be much more active as a flux than rosin alone.

Generally speaking, my composition consists of an anti-fermentive, organic acid or the salt thereof with a liquid vehicle, such as glycerine, per se, or a glyceride oil such as cottonseed oil or the like and rosin. Preferably my composition consists of one part by weight salicylic acid, one part by weight of glycerine and one part by weight of rosin.

While as above stated I prefer to use salicylic acid, certain other anti-fermentive organic acids or other ammonium salts may be used, such for instance, as benzoic acid, ammonium benzoate or ammonium salicylate, the fluxing action of these substitutes being nearly identical with salicylic acid and their anti-fermentive properties are similar. Therefore, I do not wish to be limited to the use of salicylic acid as the use of any other fermentive organic acids or their salts is within the spirit of my invention except as defined in the appended claims.

Neither do I wish to be limited to the use of glycerine, as cottonseed oil or other glyceride oil may be used without departing from the spirit of the invention.

Glycerine as a vehicle, however, is most desirable for core solder. This is because of the fact that the glycerine as a vehicle for the acid element in the compound causes the preferred composition to have a solid consistency at normal temperatures, without odor. Furthermore, the use of glycerine in the flux for a core solder provides a vehicle allowing a maximum quantity of the active element and prevents the too rapid sublimation of the salicylic acid. While glycerine is particularly adaptable for the use in a flux to constitute the core of tubular solder element, where the flux is to be used as a paste, the cottonseed oil or other glyceride oil is desirable inasmuch as the quantity of the oil necessary is much less than that of glycerine in order to give a fluid consistency and retain as large quantity of the active element in the compound while soldering as possible. Many other vegetable oils than cotton seed may be used and polyhydric alcohols may be used as a necessary vehicle within the spirit of my invention as defined in the appended claims.

A soldering flux of this composition may be used separate from the solder or used as a core for the solder without decomposing the flux and at the same time such composition will be much more active than rosin alone. As before stated, such a composition as this is non-poisonous, noncorrosive and particularly, inasmuch as the most active ingredient of the composition is anti-fermentive, should a portion of the flux enter the food container, while being sealed, it will not in any way affect deleteriously the contents of the container, nor will this flux, formed as described, act to curdle milk if a portion of the flux enters the can.

While above I have referred to this soldering flux as being particularly adapted for use in sealing cans containing food, it is to be noted that it is particularly valuable in radio and all other electrical work as it is non-corrosive on delicate work and the flux residue will not cause electrical interference as is caused by other soldering fluxes.

While I have heretofore referred to the use of one part each of the various ingredients, I do not wish to be limited to this as I may use one to ten parts by weight of the acid or its salt, one to ten parts by weight of glycerine or glyceride oil and one to ten parts by weight of rosin base.

I claim:—

1. A soldering flux having in its composition, salicylic acid.

2. A soldering flux having in its composition, salicylic acid, an oily glyceride vehicle and rosin.

3. A soldering flux consisting of one part by weight of salicylic acid, one part by weight glycerine and one part by weight rosin.

4. A soldering flux having in its composition an acid derivative of the benzene series, an oily glyceride vehicle and rosin.

In testimony whereof I hereunto affix my signature.

ERNEST F. BOWERS.